United States Patent
Huott et al.

(10) Patent No.: US 7,536,613 B2
(45) Date of Patent: May 19, 2009

(54) BIST ADDRESS GENERATION ARCHITECTURE FOR MULTI-PORT MEMORIES

(75) Inventors: William Vincent Huott, Holmes, NY (US); Pradip Patel, Poughkeepsie, NY (US); Daniel Rodko, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 10/843,608

(22) Filed: May 11, 2004

(65) Prior Publication Data

US 2005/0268167 A1   Dec. 1, 2005

(51) Int. Cl.
*G11C 29/00* (2006.01)
*G11C 7/10* (2006.01)
(52) U.S. Cl. .................. 714/718; 365/189.04; 365/201
(58) Field of Classification Search .................. None
See application file for complete search history.

(56) References Cited

U.S. PATENT DOCUMENTS

| | | | | |
|---|---|---|---|---|
| 4,945,548 A | * | 7/1990 | Iannarone et al. ........... 375/214 |
| 4,965,794 A | * | 10/1990 | Smith ......................... 370/506 |
| 5,267,199 A | * | 11/1993 | Galuszka et al. ....... 365/189.04 |
| 5,442,641 A | | 8/1995 | Beranger et al. ........... 371/21.2 |
| 5,796,745 A | * | 8/1998 | Adams et al. ............... 714/718 |
| 5,835,502 A | * | 11/1998 | Aipperspach et al. ....... 714/718 |
| 5,898,893 A | * | 4/1999 | Alfke .......................... 710/57 |
| 5,954,830 A | | 9/1999 | Ternullo et al. ............. 714/718 |
| 6,046,946 A | * | 4/2000 | Nadeau-Dostie et al. .... 365/201 |
| 6,779,141 B1 | * | 8/2004 | Pendurkar .................... 714/719 |
| 2002/0071332 A1 | * | 6/2002 | Nishiyama et al. ...... 365/230.01 |
| 2002/0199136 A1 | * | 12/2002 | Ku ............................... 714/30 |
| 2004/0240308 A1 | * | 12/2004 | Pendurkar .................... 365/232 |
| 2005/0204239 A1 | * | 9/2005 | Miyaji et al. ................ 714/738 |

* cited by examiner

*Primary Examiner*—Cynthia Britt
*Assistant Examiner*—Guerrier Merant
(74) *Attorney, Agent, or Firm*—Ido Tuchman; Lynn L. Augspurger

(57) ABSTRACT

Disclosed is testing multi-port array macros where latches and logic are used to control the relationship between the write and read port of the array. This makes allowance for many different configurations of reading and writing the array. This also allows for greater test coverage than the previous method, which simply inverted one of the write address bits to form the read address.

5 Claims, 4 Drawing Sheets

| Latch<0> | Latch<1> | Latch<2> | Read Address (with respect to write address) |
|---|---|---|---|
| 0 | 0 | 0 | Opposite (12) |
| 1 | 1 | 1 | Equal (13) |
| 1 | 1 | 0 | Low order inversion (14) |
| 0 | 1 | 1 | High order inversion (15) |

FIG. 4

BIST ADDRESS GENERATION ARCHITECTURE FOR MULTI-PORT MEMORIES

BACKGROUND OF THE INVENTION

1. Field of the Invention

Our invention relates to testing, including pattern generation and address testing of integrated circuits, and more particularly, microprocessor chips containing multi-port arrays. A further aspect of the invention is the testing relationship between the read and write address ports.

2. Description of Background

Array macros are used in microprocessors to store information. Hardware errors affect these arrays in array cells, wordlines, bitlines, etc. ABIST (Array Built-In Self Test) engines are used to test for these errors and to help diagnose the root cause of any problem. ABIST engines are described in U.S. Pat. No. 5,954,830, Method And Apparatus For Achieving Higher Performance Data Compression In ABIST Testing By Reducing The Number Of Data Outputs; and U.S. Pat. No. 5,442,641 Fast Data Compression Circuit For Semiconductor Memory Chips Including An Array Built-In Self-Test Structure.

One type of an array is the multi-port array. Cells that each contain separate read and write ports as opposed to the standard single port 6-device cell characterize multi-port arrays. With a multi-port array the user is able to read and write data to different cells on the same cycle. However, if the user asks for a read operation and a write operation at the same address, the write is guaranteed, but the read is not. The testing for multi-port array macros is more complex than testing for the standard single port arrays.

One problem with ABIST engines as applied to multi-port arrays is that separate address counters are needed for the read and write ports. The result is that the separate address counters for the read and write ports increase the ABIST logic that is needed. This leads to increased ABIST size. One solution is use the same address counter for the read and write addresses, except that one bit is inverted to avoid reading and writing the same address in one cycle. Unfortunately, this artifact does not provide much flexibility in testing. Thus, a clear need exists for a more refined method for controlling the relationship between the read and write addresses would improve testing capability for multi-port arrays.

SUMMARY OF THE INVENTION

The shortcomings of the prior art are overcome and additional advantages are provided through the provision of a method, system, program product, and circuit that provides greater flexibility in controlling the relationship between the read and write addresses when testing a multi-port array macro. Several different methods of cycling through the read/write address counter are now available, instead of only one method possible before. Only extra scan-only latches and logic gates are needed, which is much more cost-effective than adding extra clocked latches.

The method, system, and program product tests a multi-port memory array with an ABIST engine that provides test patterns to the array. The ABIST engine includes logic for controlling read and write addresses of the memory array to avoid simultaneously reading from and writing to the same cell. This is accomplished by setting (through the ABIST engine) mode bits for read/write address relationships. In order to accomplish this the ABIST engine multiplexes the mode bits to select bit or word addressing.

The ABIST engine allows for logic transform from write addressing to read addressing, with the logic controlling a dynamic relationship between the read and write addresses of the macro to avoid simultaneously reading from and writing to the same cell.

The control signals provide an address control configuration that avoids simultaneously reading from and writing to the same cell. The circuitry generates the read addresses from multi-port array address configuration logic. In one example the address configuration logic receives inputs indicating the ABIST engine mode, and if the ABIST engine is in the write mode outputting control bits and XOR the control bits with a write address to produce a read address.

The addressing produced by the ABIST can be an inversion of the write addressing, or equal to the write addressing, or inversions of the write addressing in the low or high order bits, or in the middle order bits.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 illustrates, as an example, a table of three (3) control bits used to generate the read address from the write address.

The detailed description explains the preferred embodiments of the invention, together with advantages and features, by way of example with reference to the drawings.

DETAILED DESCRIPTION OF THE INVENTION

In standard ABIST designs for single-port array macros, one address counter is exclusively used to stimulate the address port of the array. A multi-port array with a separate read port and write port makes testing more complicated. One solution in the prior art sets up two distinct counters read and write address testing, but expedient increases the overall size of the ABIST engine significantly and also increases the complexity of the internal logic.

Figure 1:
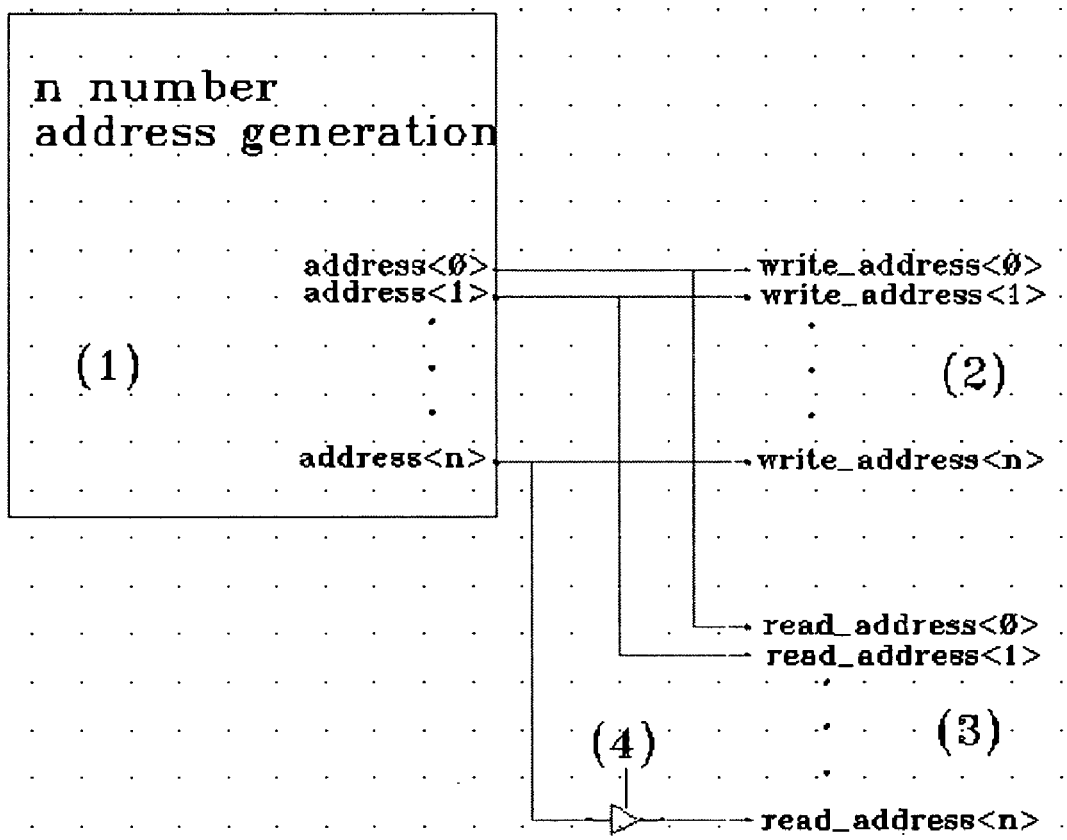
FIG. 1 illustrates an older method of testing for multi-port array macros. The write and read addresses were taken from the same address counter with one low order bit inverted to avoid writing and reading the same array cell in the same cycle.

As shown in FIG. 1, a simpler solution used in previous designs has been to hard-wire an inversion (4) of one bit of the main address port (1). The write address bits (2) come from the main address port while the read address bits (3) contain the low order inversion. This is done in order to make sure that the same address is not undergoing a read and write operation during the same cycle. If this operation, a simultaneous read from and write to the same cell, was to occur, the cell would be written to, but the read operation could not be guaranteed.

While a simple inversion solution is acceptable, this does not allow for much flexibility or control of whatever address port is not connected directly to the address counter. A more flexible approach as described herein below increases testability.

The method, system, and program product tests a multi-port memory array with an ABIST engine that provides test patterns to the array. The ABIST engine includes logic for controlling read and write addresses of the memory array to avoid simultaneously reading from and writing to the same cell. This is accomplished by setting (through the ABIST engine) mode bits for read/write address relationships. In order to accomplish this the ABIST engine multiplexes the mode bits to select bit or word addressing.

The ABIST engine allows for logic transform from write addressing to read addressing, with the logic controlling a dynamic relationship between the read and write addresses of the macro to avoid simultaneously reading from and writing to the same cell.

The control signals provide an address control configuration that avoids simultaneously reading from and writing to the same cell. The circuitry generates the read addresses from multi-port array address configuration logic. In one example the address configuration logic receives inputs indicating the ABIST engine mode, and if the ABIST engine is in the write mode outputting control bits and XOR the control bits with a write address to produce a read address.

The addressing produced by the ABIST can be an inversion of the write addressing, or equal to the write addressing, or inversions of the write addressing in the low or high order bits, or in the middle order bits.

Figure 2:
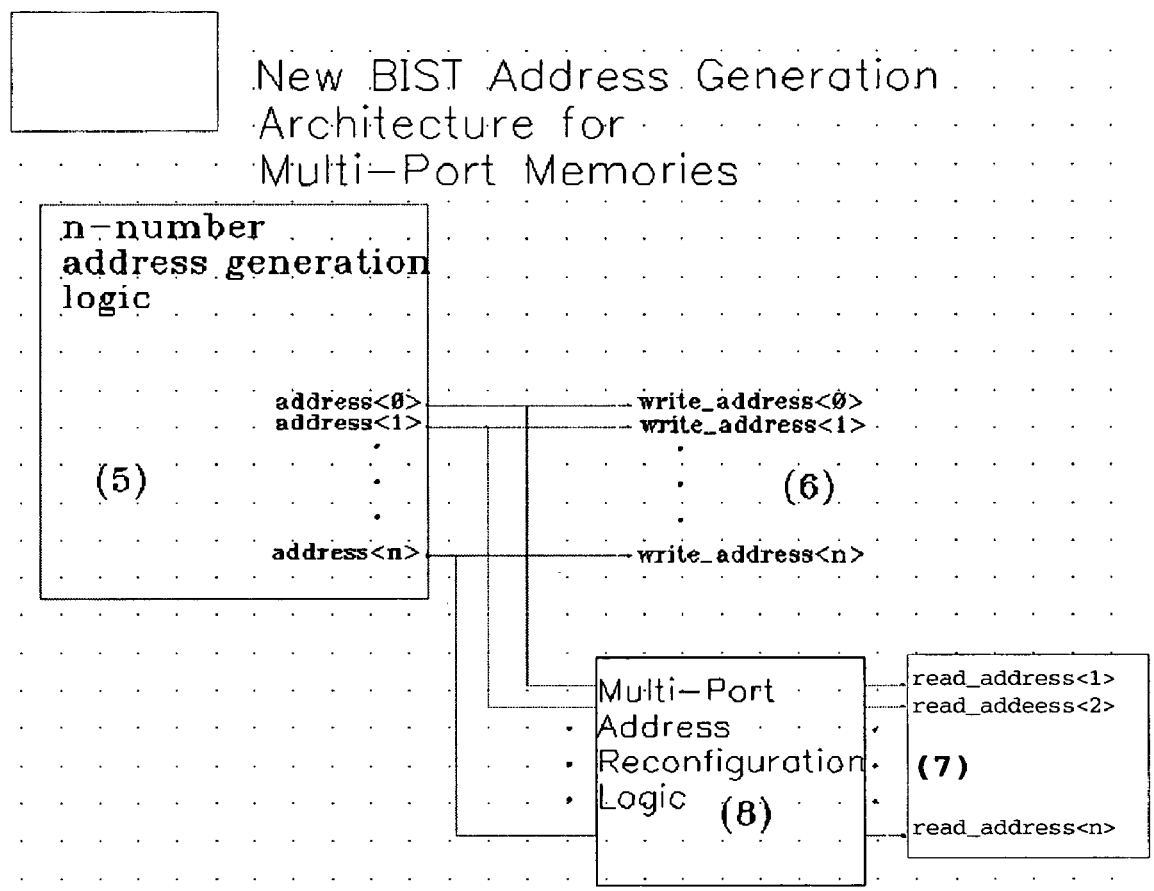
FIG. 2 illustrates one example of a logical diagram of the new architecture used to generate the read address from the write address.

FIG. 2 shows one solution to this problem. The write addresses (6) are still generated directly from the n-number address generation logic. (5) However, instead of a simple inversion, the read addresses (7) is generated from multi-port address reconfiguration logic. (8)

Figure 3:
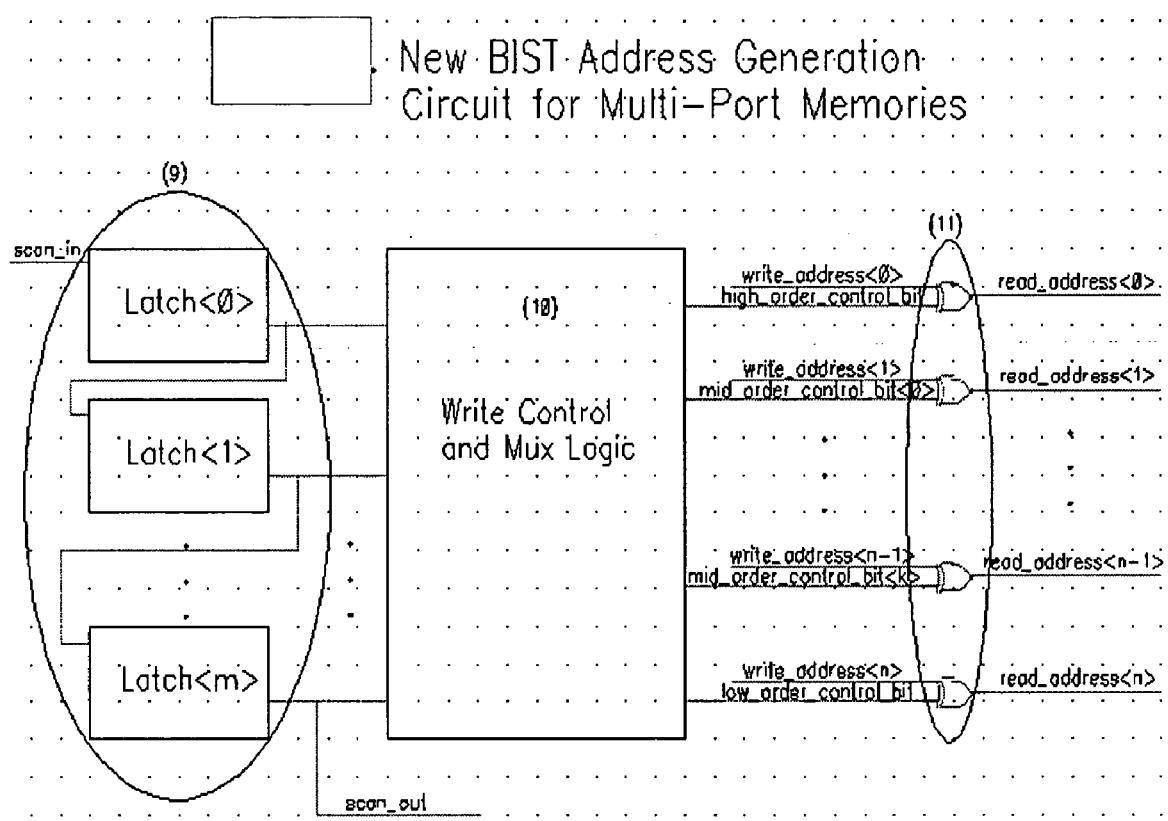
FIG. 3 illustrates a detailed circuit diagram of the new BIST address generation for multi-port memories.

FIG. 3 shows a configuration with m-number latches providing various decoded configurations. Scan-only latches (9) allow bits to be set that control the relationship between the write and read addresses. These bits are then processed through write control and multiplexing logic. (10) This logic receives inputs from other circuitry to know when the ABIST engine is in write mode and if the address counter is in bit mode or word mode. The logic block (10) will output k+2 control bits, which are XORed with n-number write addresses to produce n-number read addresses. (11)

The method, system, and program product of our invention can generate a wide range of addresses. FIG. 4 shows, as an example, what operations are available using only three scan latches. While eight distinct configurations are available, only four prove to be useful.

The first configuration enables the read address to be the total inversion of the write address. (12) Data is written from the starting address upward while data is read from the final address downward. These operations would cross over at the middle address of the array, and no array cell will be in read and write mode simultaneously. This is perhaps the most useful and important configuration of the four.

The second configuration allows for the read address to equal the write address. (13) Data can never be read from the array, but cells will be written with information. This configuration is used to test if the 2-port array cell can indeed guarantee a write when the read and write addresses are equal.

The third configuration provides for a read address that is equivalent to the write address except for the inversion of the low order bit. (14) This would allow for the reading and writing of 2-port cells that are on the same wordline, which would provide meaningful test results.

For the fourth illustrated mode of operation, the high order bit of the write address is inverted for the read address. (15) The reading of data from the array will begin from the middle of the array and will wrap around to the starting address at the end of the array. The writing of data will proceed from the starting address on upward. The other four configurations would provide combinations of inversions of the middle group of read address bits, which would be redundant and confusing to debug. These four modes of operation are a definite improvement over an inversion of a low or high order bit as in the prior art designs. It is also more cost-effective and efficient than having to add extra stand-alone latches for the read address counter.

The flow diagrams depicted herein are illustrative examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The invention may be implemented, for example, by having the BIST read address generator as a software application (as an operating system element), a dedicated processor, or a dedicated processor with dedicated code. The code executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for BIST read address generator.

This signal-bearing medium may comprise, for example, memory in a server. The memory in the server may be non-volatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++".

Additionally, the program code may, for example, be compressed, encrypted, or both, and may include executable files, script files and wizards for installation, as in Zip files and cab files. As used herein the term machine-readable instructions or code residing in or on signal-bearing media include all of the above means of delivery.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of testing a multi-port array with an Array Built In Self Test macro comprising:

providing control signals to the multi-port array to generate read addresses and provide an address control configuration;

receiving inputs indicating the ABIST engine mode; and if the ABIST engine is in the write mode, outputting control bits and XORing the control bits with a write address to produce a read address different from the write address to avoid simultaneously reading from and writing to the same cell.

2. An integrated circuit chip comprising:

a multi-port memory array and ABIST engine providing test patterns to said array; and logic carried by said ABIST engine for controlling read and write addresses of said memory array, said logic setting mode bits for read/write address relationships, multiplexing mode bits to select between bit addressing and word addressing, providing control signals to the multi-port array to generate read addresses and provide an address control configuration, receiving inputs indicating the ABIST engine mode, and if the ABIST engine is in a write mode, outputting control bits and XORing the control bits with a write address to produce a read address different from the write address to avoid simultaneously reading from and writing to the same cell.

3. The integrated circuit chip according to claim 2, wherein said ABIST engine produces read addressing that contains inversions of write addressing only in the low or high order bits.

4. The integrated circuit chip according to claim 3, wherein said ABIST engine produces read addressing containing at least one inversions of write addressing in middle order bits.

5. A program embodied in a tangible computer readable medium for testing a multi-port array cell with an Array Built In Self Test macro said code comprising instructions for controlling the dynamic relationship between the read and write addresses of the macro to, said instructions defining a program for:

setting mode bits for read/write address relationships;

multiplexing the mode bits to select between bit addressing and word addressing;

providing control signals to the multi-port array to generate read addresses and provide and address control configuration;

receiving inputs indicating the ABIST engine mode; and if the ABIST engine is in a write mode, outputting control bits and XORing the control bits with a write address to produce a read address different from the write address to avoid simultaneously reading from and writing to the same cell.

* * * * *